Oct. 19, 1948.  B. W. JOHNSON ET AL  2,451,678
MULTIPLE PORT VALVE STRUCTURE
Filed April 4, 1945  3 Sheets-Sheet 1
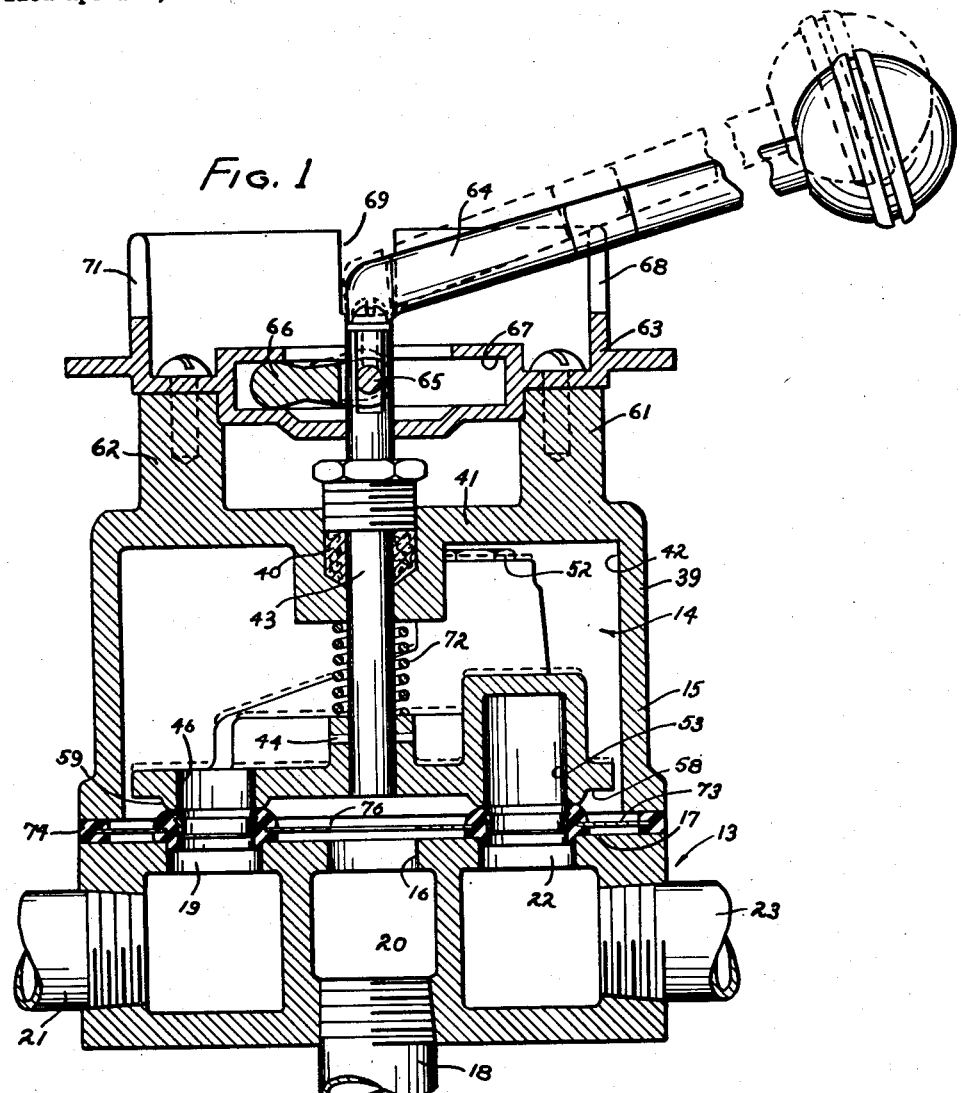
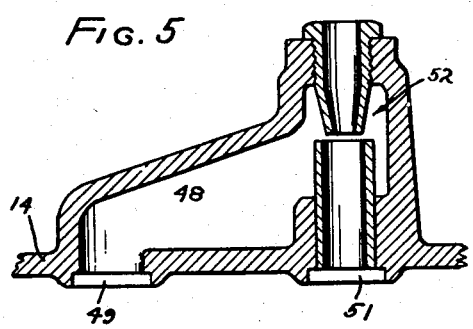
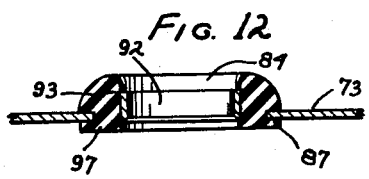
INVENTORS
Bruce W. Johnson
Adolph A. Bullerjahn
BY
McCanna and Morsbach Oct. 19, 1948.  B. W. JOHNSON ET AL  2,451,678
MULTIPLE PORT VALVE STRUCTURE
Filed April 4, 1945  3 Sheets-Sheet 2
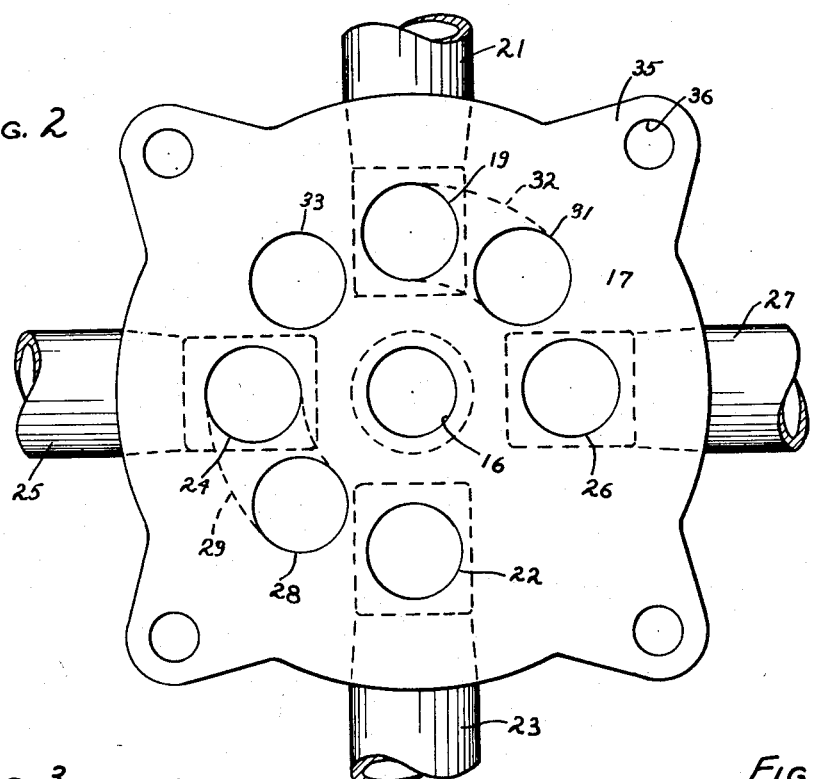
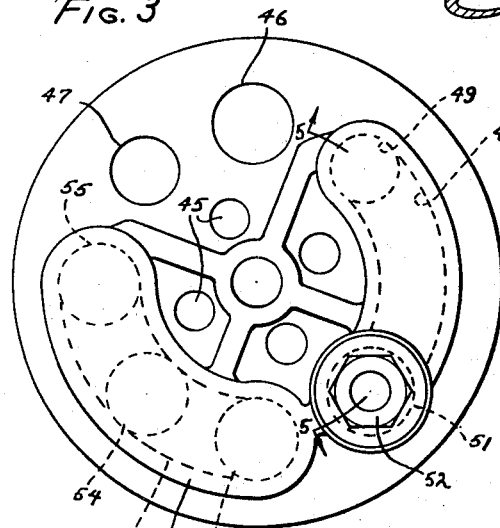
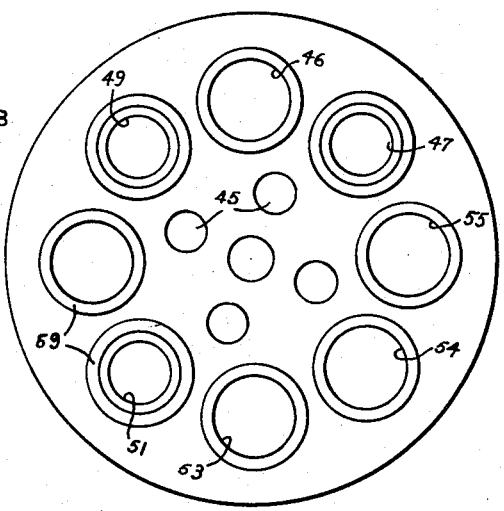
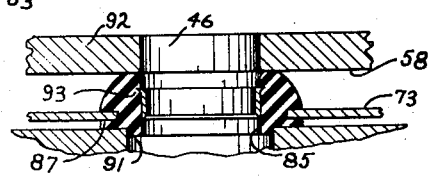
INVENTORS
Bruce W. Johnson
Adolph B. Bullerjahn
BY
McCanna and Morsbach Oct. 19, 1948.  B. W. JOHNSON ET AL  2,451,678
MULTIPLE PORT VALVE STRUCTURE
Filed April 4, 1945  3 Sheets-Sheet 3
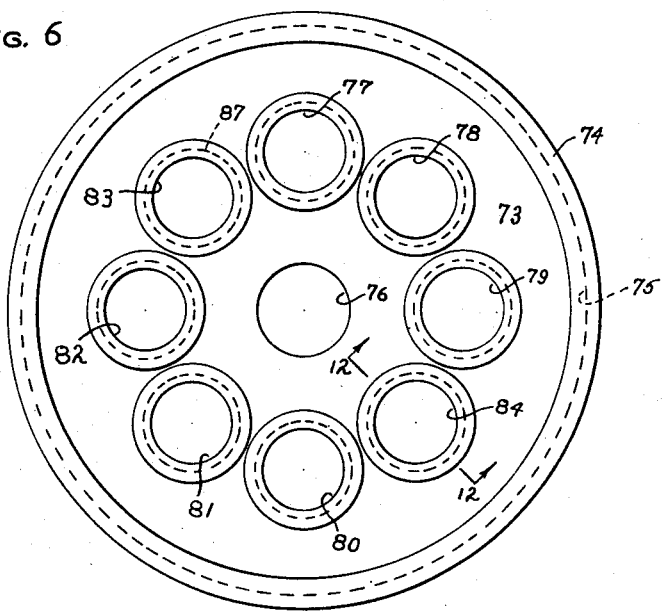
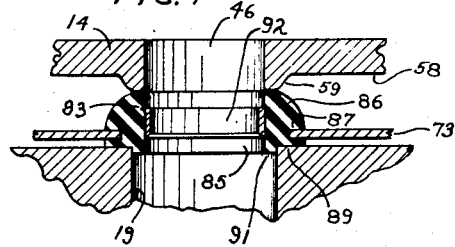
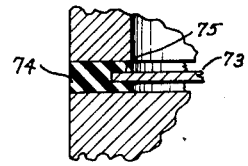
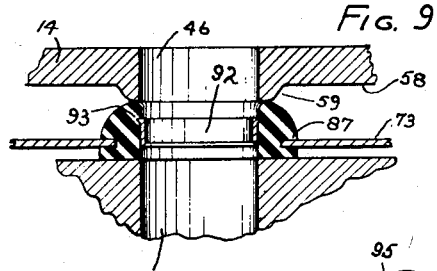
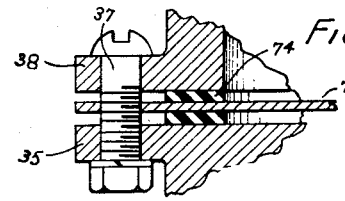
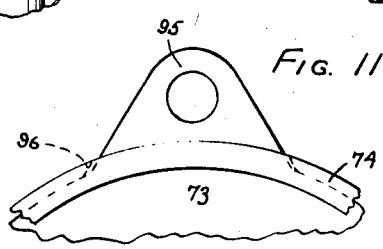
INVENTORS
Bruce W. Johnson
Adolph D. Bullerjahn
BY
McCanna and Morsbach Patented Oct. 19, 1948

2,451,678

UNITED STATES PATENT OFFICE 2,451,678

MULTIPLE PORT VALVE STRUCTURE

Bruce W. Johnson, Rockford, Ill., and Adolph D. Bullerjahn, Milwaukee, Wis., assignors to Automatic Pump & Softener Corporation, Rockford, Ill., a corporation of Illinois Application April 4, 1945, Serial No. 586,568

9 Claims. (Cl. 251—84)

1

This invention relates to valves of the multiple port disk type, and has special reference to a valve having a novel arrangement of gaskets for sealing the space between the stator and the bonnet of the valve and the spaces between the rotor and the stator.

The primary object of the invention is the provision of a valve of the character described having an improved gasket arrangement wherein separate gaskets are provided at each port of the valve, the gaskets being held together in preselected position by means of a plate or spider so arranged that the gaskets are inserted and removed as a unit in preselected position in the valve, and so that the individual gaskets when required may be individually removed and exchanged.

Another object of the invention is the provision of a valve structure in which the gaskets are removably carried on a gasket support separate from other elements of the valve, the gasket support being arranged to interfit with other elements of the valve so as to insure the gaskets being assembled in the required relationship in the valve.

Other objects and advantages will appear from the following discussion and the accompanying drawings, in which—

Figure 1 is a vertical section through a valve embodying the invention;

Fig. 2 is a top view of the stator face showing the pipe connections thereto;

Fig. 3 is a top elevational view of the rotor;

Fig. 4 is a bottom elevational view of the rotor;

Fig. 5 is a section on the line 5—5 of Fig. 3;

Fig. 6 is a top elevational view of the gasket assembly;

Fig. 7 is a fragmentary section through the rotor and stator and one of the port gaskets;

Fig. 8 is a fragmentary section showing part of the stator, part of the bonnet and the peripheral edge of the gasket assembly;

Fig. 9 is a section showing a modified form of port gasket;

Fig. 10 is a fragmentary section similar to Fig. 8 showing a modified form of the gasket assembly;

Fig. 11 is a fragmentary top elevation of the gasket assembly shown in Fig. 10;

Fig. 12 is a view taken on the line 12—12 of Fig. 6 showing the form of the gasket disposed in the port 84, and Fig. 13 is a section showing a form in which the lower face of the rotor is plane.

The invention is herein shown as embodied in a valve of the so-called lift-turn plate type which

2 comprises a stationary member or stator 13, a movable member or rotor 14 adapted to cooperate with the stator to control a plurality of flows through the valve and enclosed within a bonnet 15 attached to the stator. The valve herein shown is one specifically designed for the control of the various flows of liquid through a water treatment device such as a water softener, and to this end the stator has a central port 16 in the face of the stator, the face being designated generally by the numeral 17 and comprising a surface adapted to cooperate with the rotor and provided with a plurality of coplanar ports as will presently be described. The port 16 opens into a chamber 20 connected by a pipe 18 to a source of water supply. In this instance the stator face has a plurality of ports arranged in circumferentially spaced relation around the port 16 as a center, these ports including a port 19 communicating with a pipe 21 normally attached to the top of the softener, a port 22 connected to the bottom of the softener through a pipe 23, a port 24 connected to a service line 25, a port 26 connected to a drain pipe 27, a port 28 interconnected with the port 25 within the body of the stator through a channel 29, a port 31 connected with the port 19 by means of a channel 32, and a port 33 connected to a source of regenerating material through a pipe not shown. Ears such as indicated at 35 are formed integral with the stator and have bolt holes 36 for the reception of bolts 37 (Fig. 10) passing through corresponding ears 38 on the bonnet, presently to be described, to secure the valve in assembled relationship.

The bonnet 15 in this instance comprises a cylindrical enclosing member adapted to be bolted or otherwise fastened to the stator and having annular walls 39 and an end wall 41 defining a valve chamber 42 within which the rotor 14 is disposed, the chamber being of such depth as to permit the rotor to be moved longitudinally to a limited degree. Passing through a stuffing box 40 on the end wall 41 of the bonnet is a stem 43. The rotor 14 is affixed to the end of the stem by any convenient or suitable means such as a press fit pin 44.

While the rotor may take a number of different specific forms, the one herein shown comprises a disk-like member attached to the valve stem 43 having a plurality of central openings 45 for the passage of water upwardly into the bonnet from the port 16. The rotor has a port 46 passing completely therethrough adapted in the service position of the valve to communicate with the port 19 of the stator, and likewise has a port 47 adapted in the same position to communicate with the port 33. A cored portion of the rotor provides a channel 48 interconnecting ports 49 and 51 of the rotor and carrying a conventional injector designated generally by the numeral 52 (Fig. 5). The rotor also has a plurality of ports 53, 54 and 55 interconnected by a channel 56 in a second cored portion 57 disposed on the upper face of the rotor. With this port arrangement it will be seen that as the rotor is moved between the various positions of the valve as will presently be described, the various ports of the rotor and stator are brought into different combinations so as to produce different combinations of flow through the valve as required for the control of a conventional zeolite water softener. Since the particular port arrangement forms no part of the present invention it is not deemed necessary to describe these combinations in detail since they will be apparent from a careful examination of the drawings. Disposed on the lower surface or face 58 of the rotor around each of the ports are raised seats 59 projecting outwardly from the plane of the face as best shown in Figure 1 adapted to cooperate with the valve gaskets as will presently be described. This is, however, an optional feature of the construction, and a flat coplanar face may be employed on the rotor if desired, as shown in Fig. 13.

Positioned on the end of the bonnet 15 are two bosses 61 and 62 on which is disposed a plate 63 through which the stem 43 passes. An operating lever 64 is attached to the upper end of the stem 43 by means of a pin 65, the lever having a finger 66 disposed between the upper and lower walls of an annular chamber 67 so that as the free end of the operating lever is raised, as from the full line position to the dotted line position of Figure 1, the lever pivots about the finger 66 moving the stem 43 longitudinally and thus raising the rotor slightly. In the dotted line position of the lever, it is drawn free of a slot 68 in the plate and can then be rotated to a slot 69 or a slot 71 as described, and upon reaching the positions of these slots can be again lowered therein so as to reseat the rotor. A coil spring 72 assists in the reseating of the rotor and acts to maintain the rotor in seated position.

In accordance with the invention a novel gasket assembly is provided for the purpose of sealing the interface between the bonnet and the stator and between the stator and the rotor at each of the ports thereof. The details of this gasket assembly are best shown in Figs. 6 through 12. The assembly comprises a retainer plate 73 of relatively thin rigid material such, for example, as sheet metal or plastic. The retainer plate is preferably of such dimensions that when properly disposed in the valve its outer edge is disposed between the stator and the ends of the walls of the bonnet as shown in Fig. 8 at least throughout the major portion of its periphery. Molded over the outer edge of the retainer plate is a gasket member 74, the gasket member having a slot therein as shown at 75 for the reception of the edge of the plate (note Fig. 8). In this manner the gasket is retained in assembled relationship on the plate as will be apparent from Fig. 6. This gasket serves when the assembly is disposed in the valve, to provide a seal between the walls of the bonnet and the face of the stator when the bolts 37 are tightened up to assemble the valve structure. A further function of this arrangement is to support the retainer plate 73 in spaced relation to the face of the stator and in predetermined fixed relationship in the valve.

The retainer plate 73 is provided with a central opening 76 disposed opposite the port 16 in the stator and is provided with openings or ports designated generally by the numerals 77 through 83, the port 77 being in alignment with port 19 of the stator, and the ports 78 through 83 being in alignment with stator ports 21, 26, 22, 28, 24 and 23, respectively. However, the retainer plate is also provided with a port or opening 84 disposed on the same circumference as the remainder of the ports and midway between the ports 79 and 80 so as to provide a seat for each port of the rotor in each position thereof and thereby seal certain of the rotor ports in certain of its angular positions. Individual gaskets are disposed in each of the ports of the retainer plate, and in one embodiment of the invention these gaskets take the form shown in Fig. 7. The gaskets are formed of resilient material adapted to be compressed and distorted by the pressure of the rotor thereagainst, a suitable material being rubber of suitable hardness. The gaskets are somewhat tubular in form and have a central bore 85 coaxial with the port. While not essential, the upper ends of the gaskets are preferably rounded as shown at 86 for contact with the rotor. The outer periphery of the gaskets is provided with an annular recess 87 for receiving the edge of the plate defining the port in the retainer plate and the lower end of the gasket is provided with a flat surface 88 adapted to bear against the face of the stator. The internal dimension of the bore 85 is slightly less than that of the associated port and the gasket is provided with a depending flange 91 projecting downwardly beyond the plane of the shoulder 89 into the port for the purpose of locating the gasket with respect thereto. Disposed within the bore 85 is an annular ring 92 of sheet metal having its upper end flared outward slightly as shown at 93, the radius of the ring being slightly greater than the normal radius of the bore so that when the ring is forced into the bore the gasket material flows or distorts slightly over the outwardly flared upper edge 93 to thereby retain the ring in the gasket. The purpose of this ring is to prevent collapse of the gasket under pressure exerted against the outer periphery thereof tending to force the gasket material in to the bore, and where the valve is used under relatively low pressures this ring may at times be dispensed with.

In order to accurately locate the angular position of the gasket assembly with respect to the stator, the retainer plate and peripheral gasket may if desired take the form shown in Figs. 10 and 11. In this form of the invention the retainer plate 73 is provided with ears 95 located to correspond with the ears 35 and 38 on the stator and the bonnet and provided with an opening for the passage of the bolt 37 as shown in Fig. 10. In this instance the slot 75 in the gasket 74 is extended completely through the gasket through limited areas required for the passage of the ears 95 therethrough as shown at 96 (Fig. 11). It will be seen that with this arrangement it is impossible to insert the gasket assembly in the valve with the port gaskets in any except the proper location.

When using the port gasket shown in Fig. 7 it is necessary that the gasket employed in the port opening 84 of the retainer plate be of slightly different form from that shown in Fig. 7, the required form being shown in Fig. 12 and being identical with that of Fig. 7 except that the depending flange 91 is eliminated and the bottom end of the gasket is entirely coplanar as shown at 97.

In Fig. 9 there is shown a modified form of plate gasket wherein the ports in the stator are made slightly smaller than in the form shown in Fig. 7, and the bore in the gasket is of the same diameter as the port in the stator so as to eliminate the depending flange 91. Thus this construction has the advantage in that it permits of the use of smaller ports in the stator where this is desirable.

Where the valve is intended for use with fluids under relatively low pressure the gaskets may be molded separately from the plate and assembled on the plate at the time of use. However, in order to insure a more perfect fit we prefer to place the retainer plate 73 directly in the mold and mold the various gaskets directly onto the plate. On the other hand, where the valve is intended for use under high pressures the gaskets may be vulcanized directly onto the plate through the use of cements of the type capable of firmly vulcanizing or adhering the gaskets to the material of the plates, such adhesives being well known in the art, one form being a product such as described in U. S. Letters Patent Nos. 1,605,190 and 1,617,588 sold under the trade name "Vulcalock."

It will be seen that our improved construction provides a unitary gasket assembly which may be handled and installed as a unit but yet retains all of the advantages heretofore associated with the use of individual gaskets at each of the ports. In addition, where the valve is to be used for relatively low pressures it permits of a structure wherein any of the gaskets may be individually replaced when damaged without the necessity of replacing the entire gasket assembly. Furthermore, the structure represents a substantial reduction in weight over prior art constructions of equal efficiency. Another advantage is the fact that it provides a structure in which neither the face of the rotor nor the face of the stator need be finished except in very limited areas contacted by the port gaskets and the bonnet gasket. Furthermore, there is incorporated in the gasket assembly means for locating the same with respect to the other elements of the valve so as to insure its proper installation by unskilled workmen.

We claim:

1. The combination in a lift-turn valve of a stator member having a face provided with a plurality of ports for the passage of fluid therethrough, a rotor member having a face opposed to the face of the stator provided with a plurality of ports arranged for registry with the ports of the stator in selected positions of the rotor, a bonnet attached to the stator enclosing the face thereof and the rotor, a rigid plate of sheet material overlying the face of one of said members and in fixed relation therewith, said plate having a plurality of openings therein coaxial with the ports in the face of the stator, gasket means interposed between the bonnet and the stator to seal the junction therebetween, a gasket of resilient material affixed to the plate at each of the openings in said plate projecting beyond one side of the plate into fixed relationship with the aforesaid one of said members and projecting beyond the opposite side of the plate for releasable engagement by the other of said members for sealing the space between the rotor and the stator, and means for lifting the rotor to separate said gaskets and said other member, turning the rotor and reseating the same to compress said gaskets between the face of the rotor and the face of the stator.

2. The combination in a lift-turn valve of a stator member having a face provided with a plurality of ports, a rotor member having a face opposed to the face of the stator provided with a plurality of ports arranged for registry with ports of the stator in selected positions of the rotor, a rigid plate of sheet material overlying the face of the stator having a plurality of openings therein coaxial with the ports in the stator, the outer edge of the plate having radially disposed ears, a gasket at the edge of said plate of greater thickness than the plate having flanges projecting inwardly on opposite sides of said plate, one of said flanges acting to space said plate from the face of the stator, a bonnet enclosing the rotor, said plate and the face of the stator seated on said gasket, fastening means for securing the bonnet to the stator shaped to engage said ears to locate said plate with respect to the stator, a port gasket of resilient material affixed to the plate at each of the openings in said plate for sealing the space between the rotor and the stator, and means for lifting, turning and reseating the rotor against said port gaskets to compress the same between the rotor and the stator.

3. The combination in a lift-turn valve of a stator member having a face provided with a plurality of ports, a rotor member having a face opposed to the face of the stator provided with a plurality of ports arranged for registry with ports of the stator in selected positions of the rotor, a rigid plate of sheet material overlying the face of the stator having a plurality of openings therein coaxial with the ports in the stator, the outer edge of plate having radially disposed ears, a gasket at the edge of said plate of greater thickness than the plate having flanges projecting inwardly on opposite sides of said plate, one of said flanges acting to space said plate from the face of the stator, a bonnet enclosing the rotor, said plate and the face of the stator seated on said gasket, ears on the bonnet and on the stator on opposite sides of the ears on said plate, bolts extending through the ears of the bonnet plate and stator for securing the same together and locating the plate with respect to the stator, a port gasket of resilient material affixed to said plate at each of the openings therein and in contact with the stator for sealing the space between the stator and rotor in a seated position of the rotor, and means for lifting, turning and reseating the rotor.

4. A gasket assembly for use in multiple port plate type valves having a stationary plural ported stator, a plural ported rotor and a bonnet comprising a retainer plate having a plurality of ports therein approximately coaxial with respect to the ports of said stator, an annular gasket thereon disposed on opposite sides of the plate positioned for reception between said stator and said bonnet to effect a seal therebetween, and a gasket of resilient material disposed on opposite sides of said plate at each of the ports therein to effect a seal between the rotor and the stator at each port.

5. A gasket assembly for use in multiple port plate type valves having a stationary plural ported stator, a plural ported rotor and a bonnet comprising a retainer plate having a plurality of ports therein approximately coaxial with respect to the ports of said stator, an annular gasket thereon disposed on opposite sides of the plate positioned for reception between said stator and said bonnet to effect a seal therebetween, and a gasket of resilient material disposed on opposite sides of said plate at each of the ports therein to effect a seal between the rotor and the stator at each port, and means for locating the plate with respect to said stator to insure coaxial relationship of the ports of the stator.

6. A gasket assembly for use in multiple port plate valves having a ported stator, a ported rotor and a bonnet on the stator enclosing the rotor comprising a retainer plate having a plurality of ports therethrough approximately coaxial with respect to the ports of said stator, means for supporting the plate in fixed preselected relationship overlying the stator and in spaced relation thereto, and a gasket at each of the ports of the plate, each of said gaskets comprising a cylinder of resilient material disposed in the port of the plate for contact with the stator and the rotor in the seated position of the valve, the cylinder having an annular recess of about the thickness of the plate for reception of the edge of the plate at the port to retain the gasket in position on the plate.

7. A gasket assembly for use in multiple port plate type lift-turn valves having a stator provided with a face having circumferentially spaced ports, a cooperating ported rotor and a bonnet on the stator enclosing the rotor comprising a retainer plate having a plurality of ports therethrough approximately coaxial with respect to the ports of the stator, means for supporting the plate in preselected relationship with and overlying the face of the stator in spaced relation thereto, and a gasket at each of the ports of the plate, each of the gaskets comprising a tube-like body of substantially greater length than the thickness of the plate of resilient material disposed in the port of the plate having a central bore, a flat end seating against the face of the stator surrounding the port therein, an upper end sloping outwardly and downwardly receiving the rotor thereagainst in the seated position of the valve, and annular ribs disposed above and below the plate to receive the edge of the plate therebetween and retain the gasket in position thereon.

8. A gasket assembly for use in multiple port plate type lift-turn valves having a stator provided with a face having circumferentially spaced ports, a cooperating ported rotor and a bonnet on the stator enclosing the rotor comprising a retainer plate having a plurality of ports therethrough approximately coaxial with respect to the ports of the stator, means for supporting the plate in preselected relationship with and overlying the face of the stator in spaced relation thereto, and a gasket at each of the ports of the plate, each of the gaskets comprising a tube-like body of resilient material disposed in a port of the plate of substantially greater length than the thickness of the plate and having a central bore coaxial with said port, a stator engaging end having an annular shoulder seating against the face of the stator and a rib receivable in a port of the stator, a rotor engaging end receiving the rotor thereagainst in the seated position of the valve, and annular ribs disposed above and below the plate molded thereto to retain the gasket in position in the plate port.

9. A gasket assembly for use in multiple port plate type lift-turn valves having a stator provided with a face having circumferentially spaced ports, a cooperating ported rotor and a bonnet on the stator enclosing the rotor comprising a retainer plate of rigid sheet material having a plurality of ports therethrough approximately coaxial with respect to the ports of the stator, means for supporting the plate in overlying spaced relationship with the face of the stator and a gasket at each of the ports of the plate comprising a band of resilient material disposed in the port of the plate and extending beyond opposite sides thereof with one end in abutting relation to said stator, said gasket having a central bore and flanges overlying the opposite sides of the plate to retain the gasket therein, and a rigid tube of lesser length than said bore seated therein for preventing collapse of the gasket into the bore.

BRUCE W. JOHNSON.
ADOLPH D. BULLERJAHN.

REFERENCES CITED

The following references are of record in the file of this patent:

UNITED STATES PATENTS

| Number | Name | Date |
| --- | --- | --- |
| 2,153,559 | Hendricks | Apr. 11, 1939 |
| 2,201,895 | Glen | May 21, 1940 |
| 2,209,989 | McCanna | Aug. 6, 1940 |
| 2,209,992 | McGill | Aug. 6, 1940 |
| 2,209,993 | McGill | Aug. 6, 1940 |
| 2,364,697 | Daniels | Dec. 12, 1944 |